United States Patent
Huang et al.

(10) Patent No.: US 8,336,168 B2
(45) Date of Patent: Dec. 25, 2012

(54) HINGE MECHANISM AND ELECTRONIC DEVICE USING THE SAME

(75) Inventors: Lian-Cheng Huang, Shenzhen (CN); Zhen-Yu Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/210,572

(22) Filed: Aug. 16, 2011

(65) Prior Publication Data

US 2012/0194978 A1    Aug. 2, 2012

(30) Foreign Application Priority Data

Jan. 27, 2011   (CN) .......................... 2011 1 0029368

(51) Int. Cl.
*E05D 15/00*    (2006.01)

(52) U.S. Cl. ........................................... 16/369; 16/340

(58) Field of Classification Search ............... 16/297, 16/299, 335, 337, 339, 355, 357, 360, 374, 16/286, 368, 369; 361/679.08, 679.11, 679.02, 361/679.15, 679.27, 679.26, 679.21, 679.55, 361/679.22; 455/90.3, 575.1, 575.3, 575.8; 379/433.12, 433.13; 348/373, 333.01, 333.06, 348/794; 248/917, 919–923, 371, 372.1
See application file for complete search history.

(56) References Cited

U.S. PATENT DOCUMENTS

| | | | | |
|---|---|---|---|---|
| 3,179,072 A | * | 4/1965 | Coriell | 108/145 |
| 4,692,964 A | * | 9/1987 | DeBruyn | 16/367 |
| 4,834,329 A | * | 5/1989 | Delapp | 248/183.3 |
| 6,018,847 A | * | 2/2000 | Lu | 16/337 |
| 6,056,248 A | * | 5/2000 | Ma | 248/124.1 |
| 6,314,615 B1 | * | 11/2001 | Wolda | 16/367 |
| 6,430,038 B1 | * | 8/2002 | Helot et al. | 361/679.05 |
| 6,464,195 B1 | * | 10/2002 | Hildebrandt | 248/460 |
| 7,567,436 B2 | * | 7/2009 | Jeong | 361/679.22 |
| 7,669,287 B2 | * | 3/2010 | Lee et al. | 16/340 |
| 7,698,784 B2 | * | 4/2010 | Hsu et al. | 16/337 |
| 7,712,187 B2 | * | 5/2010 | Hsu et al. | 16/337 |
| 7,967,273 B2 | * | 6/2011 | Zhou et al. | 248/372.1 |
| 2004/0026298 A1 | * | 2/2004 | Ellis et al. | 208/210 |
| 2007/0201200 A1 | * | 8/2007 | Schlesener et al. | 361/683 |
| 2008/0094792 A1 | * | 4/2008 | Chen et al. | 361/681 |
| 2008/0141193 A1 | * | 6/2008 | Pikus | 716/5 |
| 2009/0146024 A1 | * | 6/2009 | Duan | 248/157 |
| 2009/0320243 A1 | * | 12/2009 | Wang et al. | 16/303 |

FOREIGN PATENT DOCUMENTS

WO    WO 2008035602 A1  *  3/2008

* cited by examiner

*Primary Examiner* — Chuck Y. Mah
(74) *Attorney, Agent, or Firm* — Altis Law Group, Inc.

(57) ABSTRACT

A hinge mechanism includes a fixing member, a rotary member, a rotary member, an adjusting member and a support member, all of which are interconnected. The rotary member is capable of being positioned in a preset manner to form an acute angle relative to the fixing member, the adjusting member is capable of being positioned in a preset manner to form an acute angle relative to the rotary member; and the support member is capable of being positioned in a preset manner to form an obtuse angle relative to the adjusting member. An electronic device using the hinge mechanism is also provided.

18 Claims, 5 Drawing Sheets

HINGE MECHANISM AND ELECTRONIC DEVICE USING THE SAME

BACKGROUND

1. Technical Field

The present disclosure generally relates to hinge mechanisms, and more particularly to a hinge mechanism and an electronic device using the same.

2. Description of Related Art

A typical foldable electronic device, such as a notebook computer, a mobile phone, or the other like device often includes a main body, a cover body, and a hinge mechanism connecting the main body and the cover body together. The existing conventional hinge mechanism generally adopts a four-bar hinge mechanism in use, and the cover body of the electronic device is capable of rotating and sliding relative to the main body of the electronic device via the hinge mechanism, thereby opening the electronic device to position the cover at a desired viewing angle relative to the main body. When the electronic device is not in use, the cover body is folded on the main body. However, the existing conventional hinge mechanism needed to be opened manually, thereby requiring the user to reset the desired viewing angle every time upon usage.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
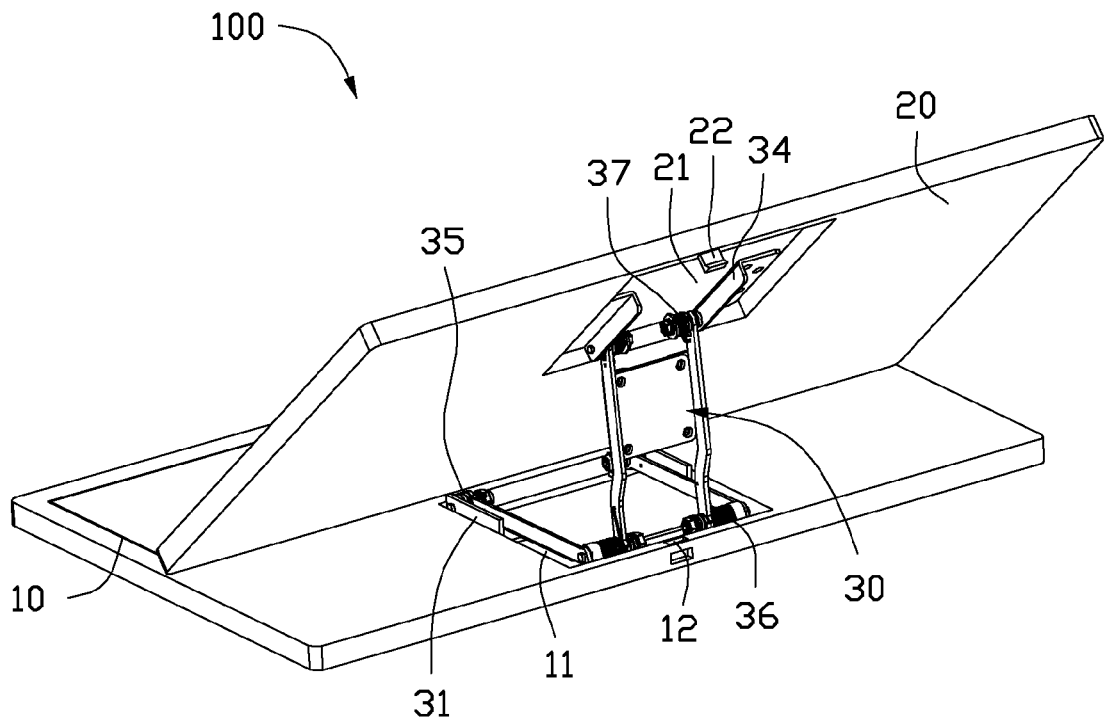
FIG. 1 shows an assembled, isometric view of one embodiment of an electronic device in use, the electronic device including a main body, a cover body, and a hinge mechanism connecting the cover body to the main body.

Referring to FIG. 1, an embodiment of a foldable electronic device 100 is shown. The electronic device 100 includes a main body 10, a cover body 20, and a hinge mechanism 30 for mounting the cover body 20 to the main body 10. The electronic device 100 can be a notebook computer, a tablet personal computer, a mobile phone, or the like. The main body 10 and the cover body 20 are both substantially rectangular. The cover body 20 is capable of automatically hinging relative to the main body 10 of the electronic device 100 via the hinge mechanism 30, thereby finally forming a viewing angle relative to the main body 10 which is considered appropriate for the user. The cover body 20 is also capable of being closed to cover the main body 10. The cover body 20 has a display screen. In the illustrated embodiment, the electronic device 100 is a notebook computer, a foldable panel computer, a mobile phone, or the like.

The main body 10 can be a substantially rectangular base with a keypad disposed (not shown) on an upper surface of the main body 10. A first assembly recess 11 is recessed in an upper surface of the main body 10 and positioned adjacent to the center of a back edge of the main body 10. A latching groove 12 is defined in the upper surface of the main body 10 communicating with one side surface of the main body 10. In the illustrated embodiment, the latching groove 12 is disposed between the first assembly recess 11 and two surfaces of the main body 10 away from the side of the keypad, and is defined in the top side surface and the back edge surface of the main body 10.

The cover body 20 is also substantially rectangular, and has a shape substantially the same as that of the main body 10. A back surface of the cover body 20 defines a second assembly recess 21, which is corresponding to the first assembly recess 11 of the main body 10, for connecting with the hinge mechanism 30. A latching hook 22 projects from the back surface of the cover body 20, for engaging in the latching groove 12 when closing the device 100. In the illustrated embodiment, the latching hook 22 is substantially L-shaped, extending from the back surface of the cover body 20 and is being positioned between the second assembly recess 21 and a top side surface of the cover body 20.

Figure 2:
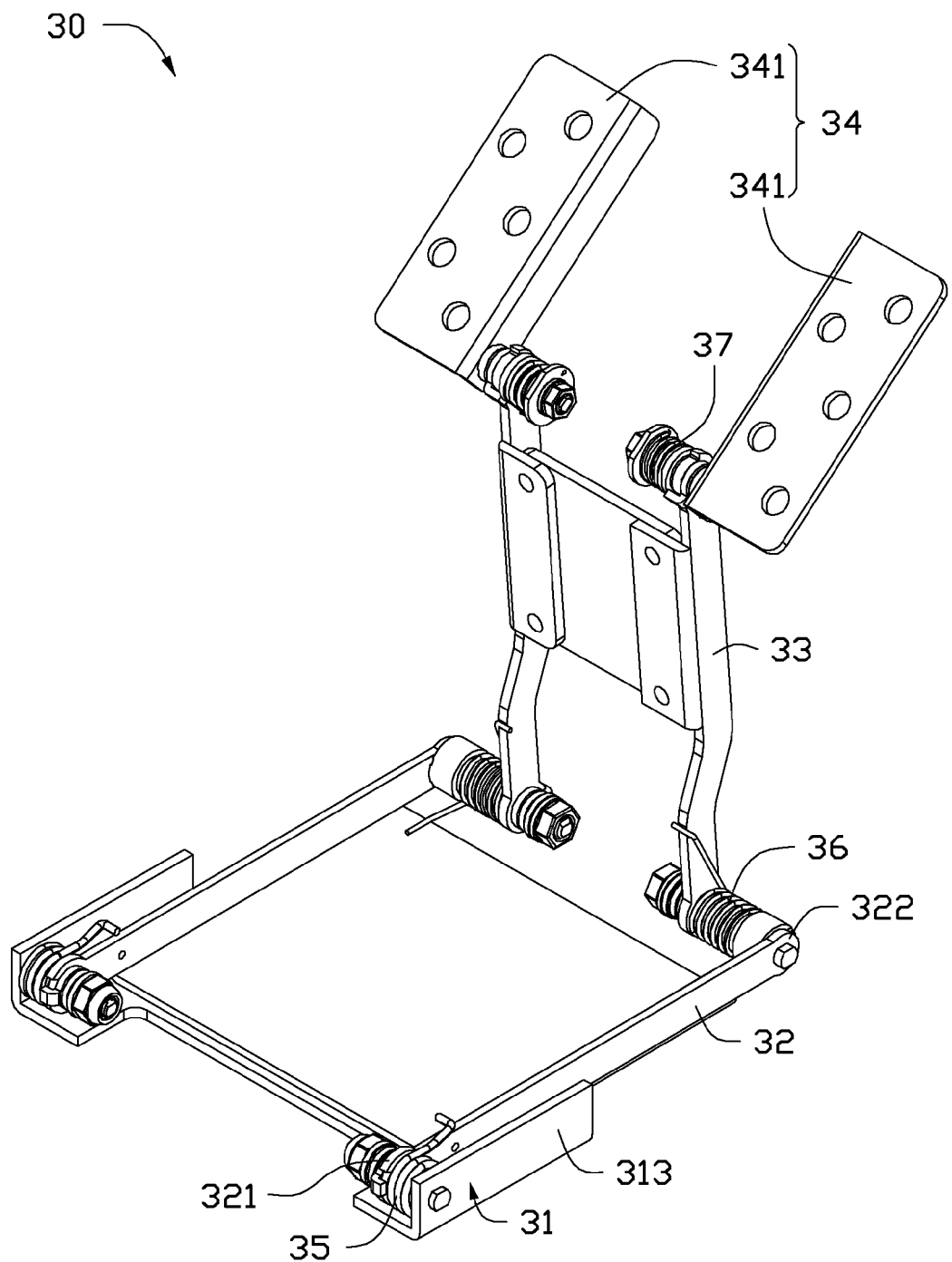
FIG. 2 shows an enlarged, assembled isometric view of the hinge mechanism of FIG. 1, in which the hinge mechanism includes a first pivot assembly, a second pivot assembly and a third pivot assembly.
Figure 3:
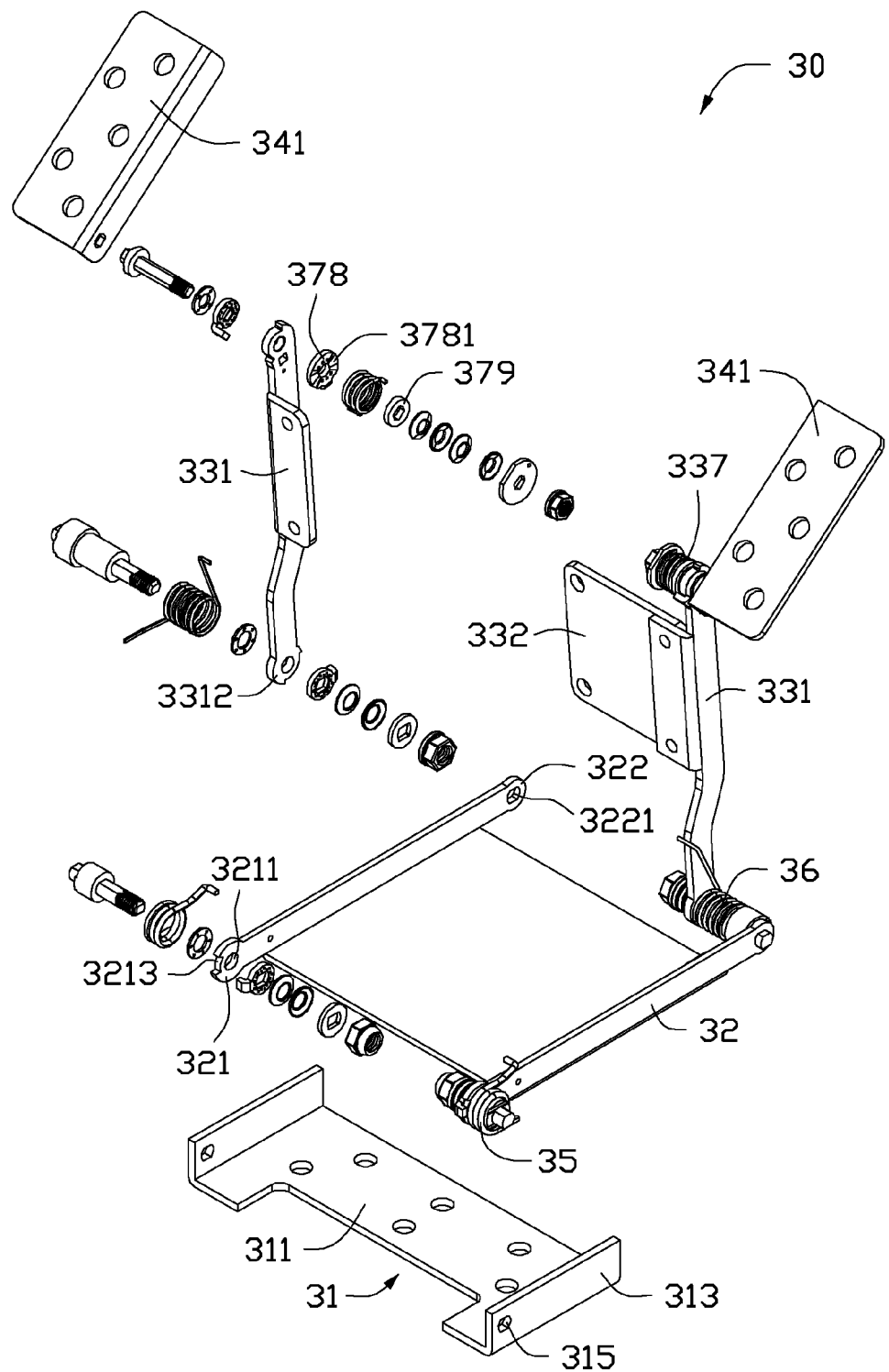
FIG. 3 shows an exploded isometric view of the hinge mechanism of FIG. 2.

Also referring to FIGS. 2 and 3, the hinge mechanism 30 includes a fixing member 31, a rotary member 32, an adjusting member 33, a support member 34, a pair of first pivot assemblies 35, a pair of second pivot assemblies 36 and a pair of third pivot assemblies 37. The fixing member 31 is fixed in the first assembly recess 11 of the main body 10. A first end of the rotary member 32 is rotatably assembled to the fixing member 31 via the pair of first pivot assemblies 35, and is capable of being positioned to form an acute angle relative to the fixing member 31 when the device 100 is in use. A first end of the adjusting member 33 is rotatably assembled to a second end of the rotary member 32 via the pair of second pivot assemblies 36, and is also capable of being positioned to form a preset acute angle relative to the rotary member 32. The support member 34 is rotatably assembled to a second end of the adjusting member 33 via the pair of third pivot assemblies 37. The support member 34 is fixed within the second assembly recess 21 of the cover body 20, and is capable of being positioned to form an obtuse angle relative to the adjusting member 33, and form an acute angle relative to the rotary member 32. In an alternative embodiment, the structures and configurations of the first pivot assembly 35, the second pivot assembly 36 and the third assembly 37 can be reduced to have only one set of pivot assembly, such that, the fixing member 31 is rotatably assembled to the first end of the rotary member 32 via one first pivot assembly 35, the opposite second end of the rotary member 32 is rotatably assembled to the first end of the adjusting member 33 via one second pivot assembly 36, and the opposite second end of the adjusting member 33 is rotatably assembled to the support member 34 via one third pivot assembly 37.

The fixing member 31 is substantially in the shape of a very shallow "U" in the illustrated embodiment, and includes a base board 311 and two side boards 313 extending in a parallel fashion from the two opposite ends of the base board 311. The base board 311 and the two side boards 313 act as a bracket to which the first end of the rotary member 32 and the first pivot assembly 35 can be attached. Each side board 313 defines a fixing hole 315 through one end thereof, corresponding to the first pivot assembly 35.

As assembled, the rotary member 32 is also substantially U-shaped. Two first hinged portions 321 are oppositely formed on two sides of the first end of the rotary member 32, and two second hinged portions 322 are oppositely formed on two sides of the second end of the rotary member 32. Each first hinged portion 321 defines a circular hinged hole 3211 and a peripheral arc-shaped cutout (an arc-shaped limit slot 3213) approximately located on the longitudinal center-line of the rotary member 32. The arc-shaped limit slot 3213 is configured for defining a preset rotating angle of the rotary member 32 relative to the fixing member 31. Each second hinged portion 322 defines a non-circular through hole 3221.

Figure 4:
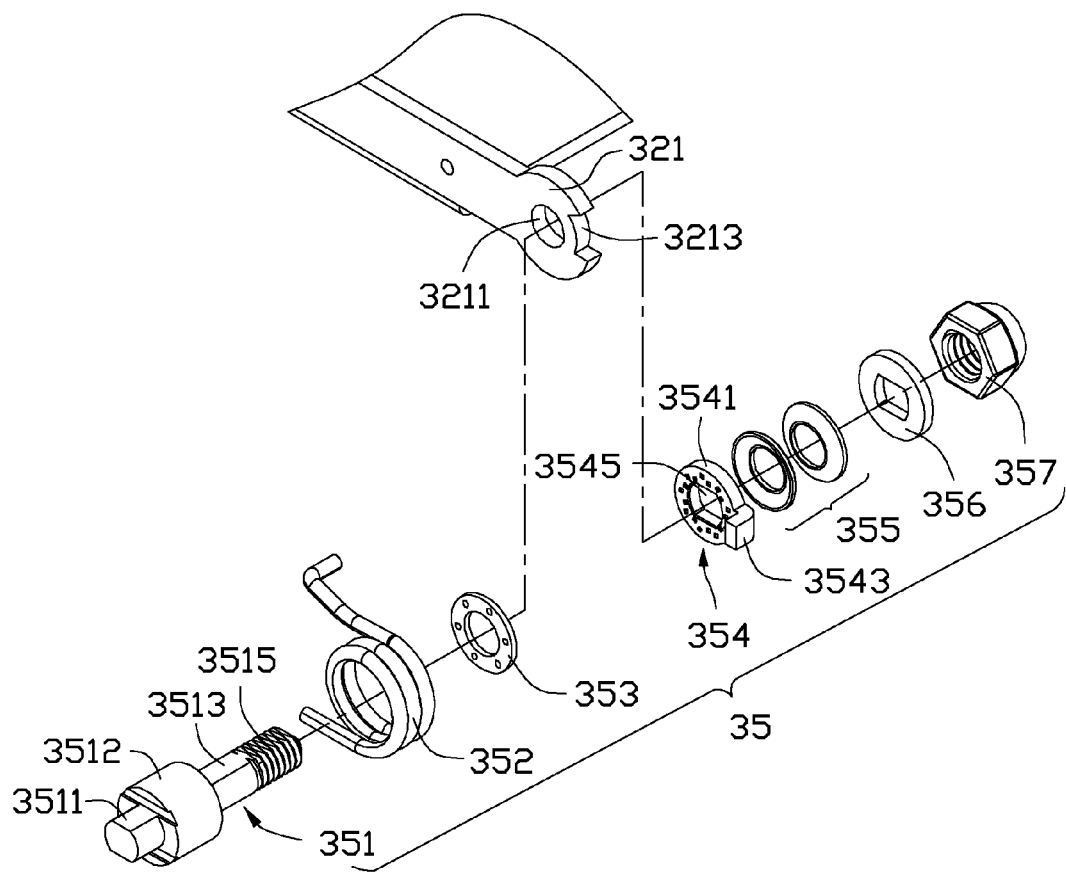
FIG. 4 shows an exploded isometric view of the first pivot assembly of the hinge mechanism of FIG. 3.

Also referring to FIG. 4, the first pivot assembly 35 includes a pivot shaft 351, an elastic member 352, a first flat washer 353, a positioning washer 354, a pair of elastic washers 355, a second flat washer 356 and a fastener 357. The pivot shaft 351 is a non-circular shaft in the present embodiment, and includes a fixing shaft portion 3511, a mounting shaft portion 3513 coaxially connecting with the fixing shaft portion 3511, and a substantially circular shaped flange 3512 coaxially disposed at the joint of the fixing shaft portion 3511 and the mounting shaft portion 3513. The other end of the pivot shaft 351 (opposite to the flange 3512) is threaded in the form of an outer screw portion 3515.

The elastic member 352 is sleeved on the pivot shaft 351 for providing an elastic force to urge the rotary member 32 to rotate relative to the fixing member 31. In the illustrated embodiment, the elastic member 352 is a torsion spring sleeved on the mounting shaft portion 3513 of the pivot shaft 351 and abuts the flange 3512 of the pivot shaft 351.

The first flat washer 353, the positioning washer 354, the pair of elastic washers 355, and the second flat washer 356 in that order are sleeved on the mounting shaft portion 3513 of the pivot shaft 351. The positioning washer 354 is non-rotatably sleeved on the mounting shaft portion 3513 of the pivot shaft 351, and includes a circular ring 3541 and a positioning arm 3543 extending from the periphery of the circular ring 3541 corresponding to the limit slot 3213 of the first hinged portion 321 of the first end of the rotary member 32. A non-circular shaped positioning hole 3545 is defined through the central portion of the circular ring 3541, corresponding to the mounting shaft portion 3513 of the pivot shaft 351.

The fastener 357 is a nut in the illustrated embodiment, and is detachably screwed onto the screw portion 3515 of the pivot shaft 351

Referring to FIGS. 2 through 4, when assembling the rotary member 32 and the fixing member 31 together, the fixing shaft portion 3511 of the pivot shaft 351 is fixed first to one corresponding first hinged portion 321 of the rotary member 32, and the flange 3512 together with the mounting shaft portion 3513 is received within the receiving space of the fixing member 31. The elastic member 352 is then sleeved on the flange 3512 of the pivot shaft 351 and abuts the inner surface of the side board 313 of the fixing member 31. A first end of the elastic member 352 resists against the base board 311 of the fixing member 31. The mounting shaft portion 3513 of the rotary shaft 351 passes through the first flat washer 353, the fixing hole 315 of one corresponding first hinged portion 321, the positioning washer 354, the pair of elastic washers 355, and the second flat washer 356 in that order. The opposite second end of the elastic member 352 is correspondingly connected to the first hinged portion 321 of the rotary member 32, thereby creating an elastic force for driving the rotary member 32 to rotate relative to the fixing member 31. The elastic member 352 is sandwiched between the side board 313 and the first flat washer 353.

The positioning washer 354 is non-rotatably sleeved on the mounting shaft portion 3513 of the pivot shaft 351 in the illustrated embodiment, and resists against the first hinged portion 321 of the rotary member 32. The positioning arm 3543 correspondingly latches into the arc-shaped limit slot 3213 of the first hinged portion 321, such that, the rotary member 32 is capable of rotating relative to the fixing member 31, the pivot shaft 351 and the positioning washer 354, within the limits of the preset rotating angle defined by the arc-shaped limit slot 3213 at the first end of the rotary member 32. The fastener 357 is detachably screwed onto the screw portion 3515 of the pivot shaft 351, to finish the assembly of the fixing member 31 and the first end of the rotary member 32 together.

Figure 5:
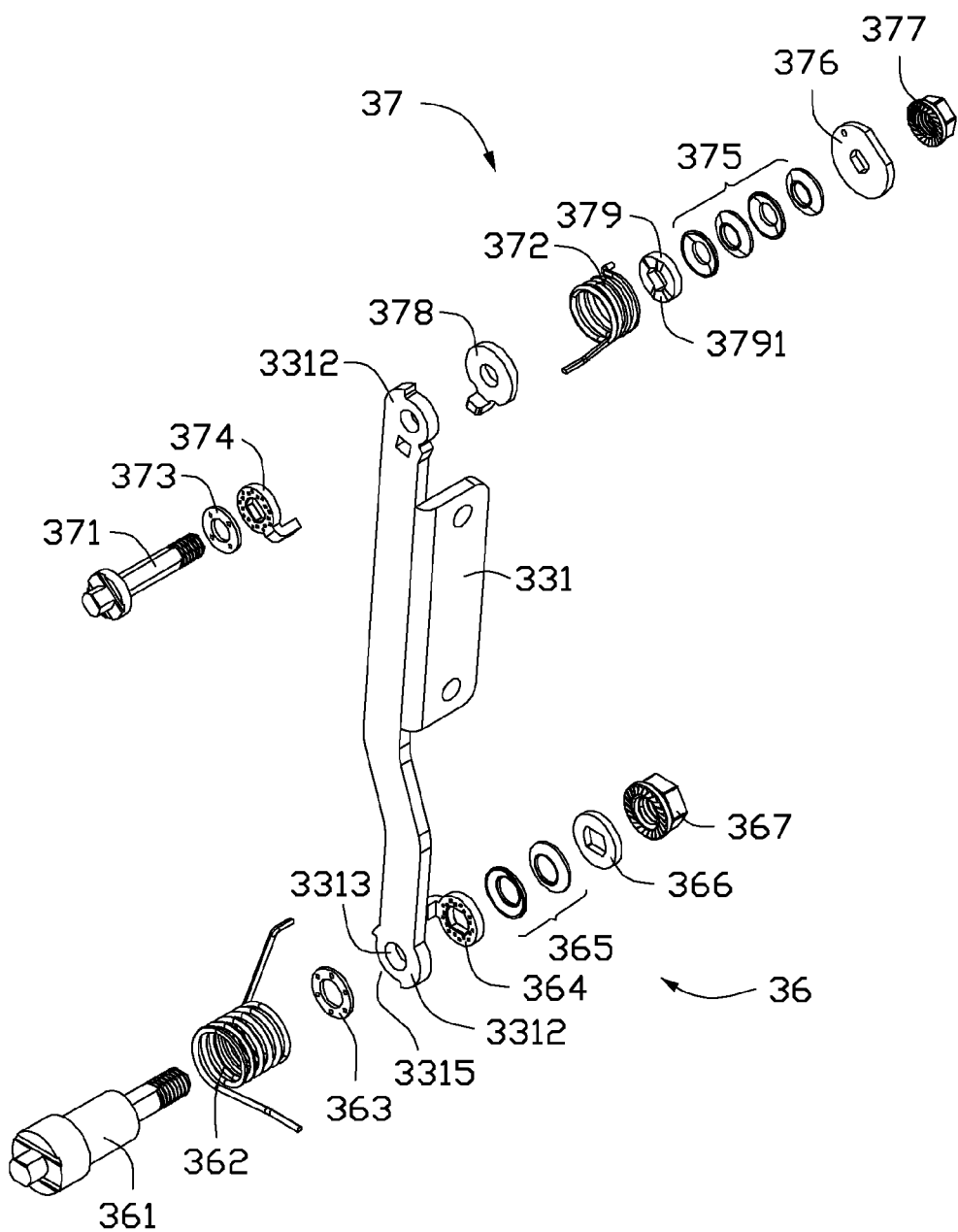
FIG. 5 shows an exploded isometric view of the second and third pivot assemblies of the hinge mechanism of FIG. 3.

Referring to FIGS. 2, 3 and 5, the adjusting member 33 is substantially H-shaped, and includes two connecting bars 331 and a strengthening board 332; the strengthening board 332 is disposed between the two connecting bars 331 and connecting the two connecting bars 331 together. The two connecting bars 331 are parallely fixed to two ends of the strengthening board 332. Each of the two ends of the connecting bar 331 forms a pivot portion 3312 having substantially the same shape as that of the first hinged portion 321 of the rotary member 32. The pivot portion 3312 defines a circular pivot hole 3313 and an arc-shaped limit slot 3315; the limit slot 3315 is coaxially surrounding the pivot hole 3313 and positioned at the distal end of the pivot portion 3312. Again, the arc-shaped limit slot 3315 is configured for limiting the rotating angle of the adjusting member 33.

The second pivot assembly 36 has substantially the same structure as that of the first pivot assembly 35, and includes a pivot shaft 361, an elastic member 362, a first flat washer 363, a positioning washer 364, a pair of elastic washers 365, a second flat washer 366 and a fastener 367. A method for assembling the adjusting member 33 to the second end of the rotary member 32 is substantially the same as the assembly method for assembling the fixing member 31 with the first end of the rotary member 32. A first end of the pivot shaft 361 is fixed to the non-circular through hole 3221 of the second end of the rotary member 32. The opposite second end of the pivot shaft 361 passes through the elastic member 362, the first flat washer 363, the pivot hole 3313 of a first end of the adjusting member 33, the positioning washer 364, the pair of elastic washers 365, and the second flat washer 366, in that order. The fastener 357 is detachably screwed onto the distal end of the pivot shaft 361, thereby assembling the second end of the rotary member 32 and the first end of the connecting bar 331 of the adjusting member 33 together. The adjusting member 33 is capable of rotating relative to the rotary member 32, within the limits of the arc-shaped limit slot 3315 at the first end of the adjusting member 33. The elastic member 362 is configured for urging the adjusting member 33 to rotate relative to the rotary member 32 and for positioning the adjusting member 33 at a preset rotating angle relative to the rotary member 32. The rotating direction of the adjusting member 33 is contrary to the rotating direction of the rotary member 32.

Referring to FIGS. 2 and 3, the support member 34 includes two support plates 341 oppositely hinged to two pivot portions 3312 of the second end of the adjusting member 33 via the third pivot assembly 37, in the illustrated embodiment. The two support plates 341 are fixed to and received with the second assembly recess 21 of the cover body 20 (shown in FIG. 1), as the hinge mechanism 30 is applied to the electronic device 100.

The third pivot assembly 37 has a similar structure as that of the first pivot assembly 35 and includes the same components as the first pivot assembly 35, namely a pivot shaft 371, an elastic member 372, a first flat washer 373, a positioning washer 374, two pairs of elastic washers 375, a second flat washer 376 and a fastener 377. In addition, the third pivot assembly 37 further includes a cam 378 and a cam follower 379. The cam 378 defines a concave portion 3781. The cam follower 379 defines a convex portion 3791 for rotatably engaging with the concave portion 3781 of the cam 378.

When assembling the support member 34 to the second end of the adjusting member 33, a first end of the pivot shaft 371 is fixed with one support plate 341 of the support member 34. An opposite second end of the pivot shaft 371 passes through the first flat washer 373, the positioning washer 374, the pivot hole 3313 of the second end of the adjusting member 33, the cam 378, the elastic member 372, the cam follower 379, the two pairs of elastic washers 375, and the second flat washer 376, in that order. The cam 378 is rotatably sleeved on the pivot shaft 371 together with the pivot portion 3312 of the second end of the adjusting member 33, but is not able to rotate relative to the pivot portion 3312 of the second end of the adjusting member 33. The cam follower 379 is non-rotatably sleeved on the pivot shaft 371 together with the second flat washer 376, and engages with the concave portion 3781 of the cam 378, thereby generating an axial pushing force to resist against the elastic washers 375 to maintain the support member 34 (together with the cover body 20 mounted thereon) at a preset angle relative to the adjusting member 33. The two pairs of elastic washers 375 are sleeved on the pivot shaft 371 and elastically sandwiched between the second flat washer 376 and the cam follower 379. The elastic member 372 is sleeved on the pivot shaft 371 and coils around the two pairs of elastic washers 375, a first end of the elastic member 372 is connected to the pivot portion 3312 of the second end of the adjusting member 33, and a second end of the elastic member 372 is connected to the second flat washer 376. The fastener 377 is detachably screwed onto the distal end of the pivot shaft 371, thereby assembling the support member 34 and the second end of the connecting bar 331 of the adjusting member 33 together.

When assembling the electronic device 100, the fixing member 31 of the hinge mechanism 30 is fixed to and received within the first assembly recess 11 of the main body 10. The two support plates 341 of the support member 34 are fixed to and received with the second assembly recess 21 of the cover body 20 to complete the assembly of the electronic device 100.

When the electronic device 100 is in the closed mode (not shown), the cover body 20 is folded, and covers the main body 10; in this closed mode, the hinge mechanism 30 is compressed and accommodated within the receiving chamber defined by the first assembly recess 11 of the main body 10 and the second assembly recess 21 of the cover body 20. The latching hook 22 of the cover body 20 latches into the corresponding latching groove 12 of the main body 10 and prevents the display screen of the cover body 20 being moved away from the main body 10 by the hinge mechanism 30. The distal end of the latching hook 22 is exposed from the back side surface of the main body 10 facilitating the release of the latching hook 22 by the user. As in the closed mode, the elastic members 352, 362, 372 of the first pivot assembly 35, the second pivot assembly 36 and the third pivot assembly 37 of the hinge mechanism 30, respectively, are all in a compressed state or under torsion, thereby creating a potential force ready to urge the hinge mechanism 30 to extend.

In use, the latching hook 22 is released by pushing the distal end thereof from the back side surface of the main body 10, the cover body 20 is then ejected upwards by the hinge mechanism 30 to automatically slide and rotate relative to the main body 10, into a preset position. The cover body 20 is finally supported by the support member 34 of the hinge mechanism 30 and forms the preset preferred viewing angle relative to the main body 10, as shown in FIG. 1. As the hinge mechanism 30 is fully stretched out, the rotary member 32 forms an acute angle relative to the fixing member 31, the adjusting member 33 forms an acute angle relative to the rotary member 32 toward the fixing member 31, the support member 34 forms an obtuse angle relative to the adjusting member 33 and is positioned away from the rotary member 32 side, for supporting the cover body 20.

The electronic device 100 is reliable in performance and is convenient to operate after employing the present hinge mechanism 30 to connect the cover body 20 and the main body 10 together. The cover body 20 of the electronic device 100 can be opened quickly by merely releasing the latching hook 22, then the cover body 20 slides and rotates relative to the main body 10, to obtain a preferred preset viewing angle automatically. By means of the support member 34 and the third pivot assembly 37, the cover body 20 of the electronic device 100 is firmly supported and positioned at the preset angle relative to the main body 10, which enhances the usability of the electronic device 100, and extends the longevity of the electronic device 100.

It is to be understood that, the fixing member 31 can also be integrally formed with the main body 10.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge mechanism, comprising:
a fixing member;
at least one first pivot assembly;
a rotary member having a first end rotatably assembled to the fixing member via the first pivot assembly, and a second end opposite to the first end thereof;
at least one second pivot assembly;
an adjusting member having a first end rotatably assembled to the second end of the rotary member via the second pivot assembly, and a second end opposite to the first end thereof;
at least one third pivot assembly; and
a support member rotatably assembled to the second end of the adjusting member via the third pivot assembly;
wherein, the rotary member is capable of being positioned to form an acute angle relative to the fixing member, the adjusting member is capable of being positioned to form an preset acute angle relative to the rotary member; the support member is capable of being positioned to form an obtuse angle relative to the adjusting member and form an acute angle relative to the rotary member, each of the at least one first pivot assembly comprises a pivot shaft, an elastic member, a positioning washer and a fastener, one end of the pivot shaft is fixed to the fixing member, the other end of the pivot shaft passes through the first end of the rotary member, the positioning washer, and is fixed with the fastener, the elastic member is sleeved on the pivot shaft and abuts against the fixing member and the rotary member, for generating an elastic force to drive the rotary member to rotate relative to the fixing member, and the positioning washer is sleeved on the pivot shaft for positioning the rotary member.

2. The hinge mechanism of claim 1, wherein the first end of the rotary member defines a hinged hole and an arc-shaped limit slot coaxially surrounding the hinged hole, the pivot shaft rotatably passes through the hinged hole of the first end of the rotary member, the positioning washer is non-rotatably sleeved on the pivot shaft and resists against the first end of the rotary member.

3. The hinge mechanism of claim 2, wherein the positioning washer comprises a ring defining a non-circular positioning hole and a positioning arm extending from a periphery of the ring, the positioning arm latches into the corresponding limit slot of the first end of the rotary member.

4. The hinge mechanism of claim 2, wherein the first pivot assembly further comprises a pair of elastic washers sleeved on the pivot shaft and elastically sandwiched between the positioning washer and the fastener.

5. The hinge mechanism of claim 2, wherein the elastic member is a torsion spring sleeved on the mounting shaft portion of the pivot shaft, and the two ends of the torsion spring respectively resist against the fixing member and the rotary member.

6. The hinge mechanism of claim 5, wherein each of the at least one third pivot assembly comprises a pivot shaft, an elastic member, a positioning washer and a fastener, one end of the pivot shaft is fixed to the support member, the other end of the pivot shaft rotatably passes through the positioning washer, the second end of the adjusting member and is fixed with the fastener, thereby rotatably assembling the support member to the second end of the adjusting member; the positioning washer is for positioning the support member to form an obtuse angle relative to the adjusting member; the elastic member is sleeved on the pivot shaft for generating an elastic force to maintain the support member at a preset angle relative to the adjusting member, together with the positioning washer.

7. The hinge mechanism of claim 6, wherein the third pivot assembly further comprises a cam rotatably sleeved on the pivot shaft, a cam follower non-rotatably sleeved on the pivot shaft, and an elastic washer sandwiched between the cam follower and the fastener, the cam follower engages with the cam and thereby generating an axial pushing force to resist against the elastic washer to maintain the support member at a preset angle relative to the adjusting member.

8. The hinge mechanism of claim 2, wherein each of the at least one second pivot assembly comprises a pivot shaft, an elastic member, a positioning washer and a fastener, one end of the pivot shaft is fixed to an opposite second end of the rotary member, the other end of the pivot shaft passes through the elastic member, a first end of the adjusting member, the positioning washer and is fixed with the fastener, thereby rotatably assembling the adjusting member to the rotary member; the positioning washer is for positioning the adjusting member to form an acute angle to the rotary member.

9. The hinge mechanism of claim 8, wherein two ends of the adjusting member each forms a pivot portion, the pivot portion defines a pivot hole and an arc-shaped limit slot coaxially surrounding the pivot hole; the positioning washer of the second pivot assembly forms a positioning arm latching into the corresponding limit slot of a first end of the adjusting member.

10. An electronic device, comprising:
a main body;
a cover body; and
a hinge mechanism foldably connecting the main body and the cover body together; the hinge mechanism comprising:
    a fixing member fixed to the main body;
    at least one first pivot assembly;
    a rotary member having a first end rotatably assembled to the fixing member via the first pivot assembly, and a second end opposite to the first end thereof;
    at least one second pivot assembly;
    an adjusting member having a first end rotatably assembled to the second end of the rotary member via the second pivot assembly, and a second end opposite to the first end thereof;
    at least one third pivot assembly; and
    a support member fixed to the cover body and rotatably assembled to the second end of the adjusting member via the third pivot assembly;
    wherein, the rotary member is capable of being positioned to form an acute angle relative to the fixing member, the adjusting member is capable of being positioned to form an preset acute angle relative to the rotary member; the support member is capable of being positioned to form an obtuse angle relative to the adjusting member and form an acute angle relative to the rotary member, each of the at least one first pivot assembly comprises a pivot shaft, an elastic member, a positioning washer and a fastener, one end of the pivot shaft is fixed to the fixing member, the other end of the pivot shaft passes through the first end of the rotary member, the positioning washer, and is fixed with the fastener, the elastic member is sleeved on the pivot shaft and abuts against the fixing member and the rotary member, for generating an elastic force to drive the rotary member to rotate relative to the fixing member, and the positioning washer is sleeved on the pivot shaft for positioning the rotary member.

11. The electronic device of claim 10, wherein the main body defines a first assembly recess recessed from an upper surface thereof, the fixing member is fixedly assembled within the first assembly recess of the main body; the cover body defines a second assembly recess recessed from a back surface thereof, the support member is fixed within the second assembly recess of the cover body and is capable of forming an obtuse angle relative to the adjusting member.

12. The electronic device of claim 11, wherein the main body further defines a latching groove in the upper surface of the main body and communicates with one side surface of the main body; the cover body further comprises a latching hook formed on the back surface of the cover body, for latching with the corresponding latching groove of the main body, as in a closed mode.

13. The electronic device of claim 11, wherein the first end of the rotary member defines a hinged hole and an arc-shaped limit slot coaxially surrounding the hinged hole, the pivot shaft rotatably passes through the hinged hole of the first end of the rotary member, the positioning washer is non-rotatably sleeved on the pivot shaft and resists against the first end of the rotary member.

14. The electronic device of claim 13, wherein the positioning washer comprises a ring defining a non-circular positioning hole and a positioning arm extending from a periphery of the ring, the positioning arm latches into the corresponding limit slot of the first end of the rotary member.

15. The electronic device of claim 13, wherein the first pivot assembly further comprises a pair of elastic washers sleeved on the pivot shaft and elastically sandwiched between the positioning washer and the fastener.

16. The electronic device of claim 13, wherein the elastic member is a torsion spring sleeved on the mounting shaft portion of the pivot shaft, and the two ends of the torsion spring respectively resist against the fixing member and the rotary member.

17. The electronic device of claim 13, wherein each of the at least one second pivot assembly comprises a pivot shaft, an elastic member, a positioning washer and a fastener, one end of the pivot shaft is fixed to an opposite second end of the rotary member, the other end of the pivot shaft passes through the elastic member, a first end of the adjusting member, the positioning washer and is fixed with the fastener, thereby rotatably assembling the adjusting member to the rotary member; the positioning washer is for positioning the adjusting member to form an acute angle to the rotary member.

18. The hinge mechanism of claim 17, wherein two ends of the adjusting member each forms a pivot portion, the pivot portion defines a pivot hole and an arc-shaped limit slot coaxially surrounding the pivot hole; the positioning washer of the second pivot assembly forms a positioning arm latching into the corresponding limit slot of a first end of the adjusting member.

\* \* \* \* \*